2,773,902
Patented Dec. 11, 1956

2,773,902

HYDROGENATION OF PHTHALONITRILES

Charles D. Heaton, El Cerrito, Calif., assignor to California Research Corporation, San Francisco, Calif., a corporation of Delaware No Drawing. Application May 10, 1954,
Serial No. 428,831

8 Claims. (Cl. 260—578)

This invention relates to a process for the hydrogenation of aromatic dinitriles, such as isophtalonitrile and terephthalonitrile. More particularly, the invention relates to a process of hydrogenating aromatic dinitriles to produce the corresponding diamines with a cobalt hydrogenation catalyst in the presence of an aqueous ammonia reaction medium of critical water concentration.

I have found that I can produce aromatic diamines from the corresponding dinitriles in high yields and at good reaction rates by carrying out the hydrogenation reaction with a cobalt hydrogenation catalyst in the presence of an aqueous ammonia diluent or reaction medium containing a critical water content. Accordingly, I have found that I can prepare aromatic diamines from the corresponding dinitriles in yields of the order of 90 percent and better when the hydrogenation reaction is carried out in a water-ammonia mixture in which liquid ammonia and water are present in an amount within the weight ratios of 50 parts ammonia to 50 parts of water and 95 parts of ammonia to 5 parts of water, preferably within a range of 80 parts of ammonia to 20 parts of water and 90 parts of ammonia to 10 parts of water. Thus, an ammonia-water ratio exceeding 95 to 5 results in a precipitous decline in reaction rate, defined as parts of aromatic dinitrile converted to the corresponding diamine per part of cobalt catalyst per minute, the parts being by weight. On the other hand, with an ammonia-water ratio below 50 to 50 severe losses in yield of the diamine, probably due to hydrolysis of the starting dinitrile, are encountered. The preferred catalyst moreover is a pyrophoric Raney cobalt catalyst, described, for example, in U. S. Patent No. 2,166,18.

The following examples are given to illustrate the practice of the present invention, the parts being by weight:

Example 1

An autoclave was charged with about 5 parts of Raney cobalt and 25 parts of isophthalonitrile. The autoclave was then closed, evacuated, charged with 100 parts anhydrous liquid ammonia and then hydrogen to a pressure of 1200 p. s. i. g. The autoclave was heated and maintained at a temperature of 240° F. with moderate agitation of the contents to insure thorough mixing of catalyst and reactants. Reaction was continued until no further drop in pressure occurred, at which point the reaction was deemed complete. Upon completion of reaction, which required 150 minutes, the autoclave was cooled, whereupon the ammonia and hydrogen were bled off. The contents of the autoclave were diluted with methanol, filtered, distilled and a fraction of meta-xylylene diamines boiling at about 222° F. at 2 mm. Hg. was recovered. The rate of conversion, parts of isophthalonitrile per part of catalyst per minute was determined to be 0.034, while the yield, based on starting dinitrile, was about 80 weight percent.

Example 2

(a) 4 parts of Raney cobalt catalyst, 20 parts of isophthalonitrile and 34 parts of para-xylene were placed in an autoclave, after which the autoclave was evacuated and charged with 66 parts of anhydrous liquid ammonia, and sufficient hydrogen to effect a pressure of 1200 p. s. i. g. Reaction conditions and working up of product were similar to those described in Example 1, except that reaction was deemed complete after 130 minutes. The rate of conversion in this run was determined to be 0.038, and the yield about 80 weight percent based on dinitrile.

(b) Following the procedure outlined in (a), except that 32 parts of methanol was used in place of para-xylene and 68 parts of anhydrous liquid ammonia was employed, resulted in conversion rate of 0.038 and a yield of 80 percent.

Example 3

Into a shaking autoclave were placed 4 parts of Raney cobalt hydrogenation catalyst, 20 parts of isophthalonitrile, and 5 parts of water. The autoclave was then closed, and evacuated. About 95 parts of anhydrous liquid ammonia was then charged to the autoclave, following which sufficient hydrogen was introduced to effect a pressure of 1500 p. s. i. g. The autoclave was then heated to a temperature of 240° F. and maintained at this temperature until completion of reaction as indicated, by no further drop in pressure, which required 85 minutes. Following reaction, the reaction product mixture was worked up as described in Example 1. The rate of conversion of the dinitrile was determined to be 0.059; and the yield of meta-xylylene diamine, better than 90 weight percent.

Example 4

Example 3 was repeated except that 90 parts of anhydrous liquid ammonia and 10 parts of water were employed. The conversion rate in this run was determined to be 0.111; and the yield, 90 weight percent.

Example 5

Example 4 was repeated except that terephthalonitrile was used in place of isophthalonitrile. Paraxylylene diamine boiling at 308° F. at 22 mm. Hg. was obtained in a yield of 90 weight percent. Rate of conversion was determined to be 0.085.

Example 6

Example 4 was repeated, except that the ammonia-water ratio was 80 to 20. Rate of conversion was determined to be 0.100; and the yield, 90 weight percent.

Example 7

Example 6 was repeated replacing isophthalonitrile with orthophthalonitrile. Ortho-xylylene diamine was obtained in a yield of 9 percent at conversion rate of 0.097.

Example 8

Example 3 was repeated employing 50 parts of ammonia and 50 parts of water. The meta-xylylene diamine in this run was obtained in a yield of 78 weight percent at a conversion rate of 0.094.

While specific reaction conditions and amounts of reactants, catalyst ammonia and water have been given in the examples, operating conditions and amounts can vary within rather wide limits.

Thus, the hydrogenation reaction temperature can vary from about 140° F. to 300° F., a more specific range being from 180° F. to 250° F. Similarly, initial pressures can vary from just sufficient to maintain the ammonia in liquid phase up to a pressure of about 3500 p. s. i. g. and higher, a generally preferred range being from about 1500 p. s. i. g. to 2800 p. s. i. g. Moreover, suitable amounts of catalyst can range from about 1 percent to 20 percent, by weight, based on the dinitrile. In general, suitable amounts of aqueous ammonia reaction medium can vary from 1 part of said medium for each part of dinitrile, by weight, to 5 parts of aqueous ammonia reaction medium for each part of dinitrile.

The products prepared in accordance with the invention are useful as intermediates in the preparation of polymers for synthetic fiber use. They are also useful in conjunction with epoxy resins, the manufacture of di-isocyanates employed in the manufacture of synthetic rubber, foam type resins, etc.

Obviously many modifications and variations of the invention, as hereinbefore set forth, may be made without departing from the spirit and scope thereof and, therefore, only such limitations should be imposed as are indicated in the appended claims.

I claim:

1. Process of preparing an xylylene diamine which comprises hydrogenating a phthalonitrile dinitrile under hydrogenation conditions of temperature and pressure in the presence of a cobalt hydrogenation catalyst and about 1 to 5 parts for each part of phthalonitrile, by weight, of a liquid ammonia-water reaction medium, the ammonia and water being present during reaction in a weight ratio of 50 to 95 ammonia to 50 to 5 water.

2. Process according to claim 1, wherein the phthalonitrile is isophthalonitrile.

3. Process according to claim 1, wherein the phthalonitrile is terephthalonitrile.

4. Process according to claim 1, wherein the phthalonitrile is orthophthalonitrile.

5. Process according to claim 1, wherein the ammonia and water are present in a weight ratio of 80 to 90 ammonia to 20 to 10 water.

6. Process according to claim 5, wherein the phthalonitrile is isophthalonitrile.

7. Process according to claim 5, wherein the phtalonitrile is terephthalonitrile.

8. Process according to claim 5, wherein the phthalonitrile is orthophthalonitrile.

References Cited in the file of this patent

UNITED STATES PATENTS

| | | |
|---|---|---|
| 2,165,515 | Schmidt | July 11, 1939 |
| 2,287,219 | Young et al. | June 23, 1942 |
| 2,449,036 | Grunfeld | Sept. 7, 1948 |